B. M. CARTWRIGHT.
STREET INDICATING APPARATUS FOR STREET CARS.
APPLICATION FILED AUG. 13, 1919.

1,435,696.

Patented Nov. 14, 1922.
7 SHEETS—SHEET 1.

INVENTOR
Burr M. Cartwright
BY Parsons & Bodell
ATTORNEYS.

B. M. CARTWRIGHT.
STREET INDICATING APPARATUS FOR STREET CARS.
APPLICATION FILED AUG. 13, 1919.

1,435,696.

Patented Nov. 14, 1922.
7 SHEETS—SHEET 4.

INVENTOR.
Burr M. Cartwright
BY
Parsons & Rodell
ATTORNEYS.

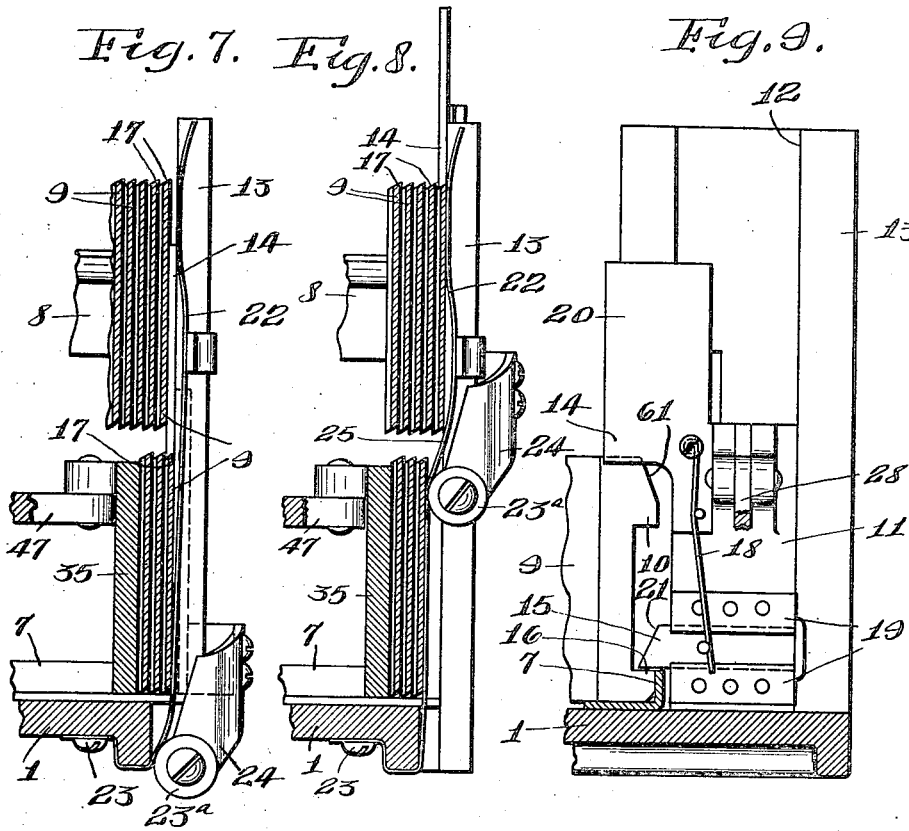

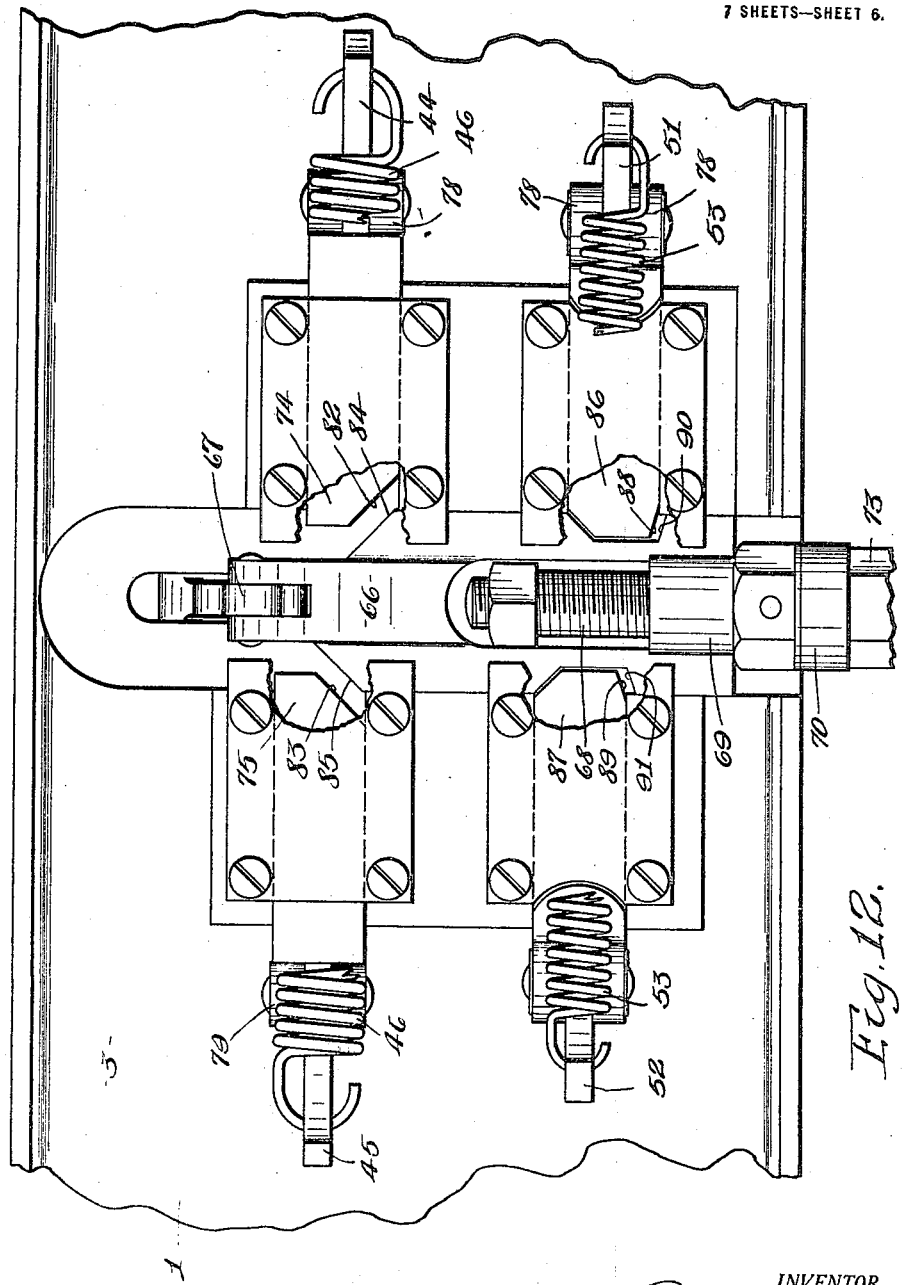

B. M. CARTWRIGHT.
STREET INDICATING APPARATUS FOR STREET CARS.
APPLICATION FILED AUG. 13, 1919.
1,435,696.
Patented Nov. 14, 1922.
7 SHEETS—SHEET 7.
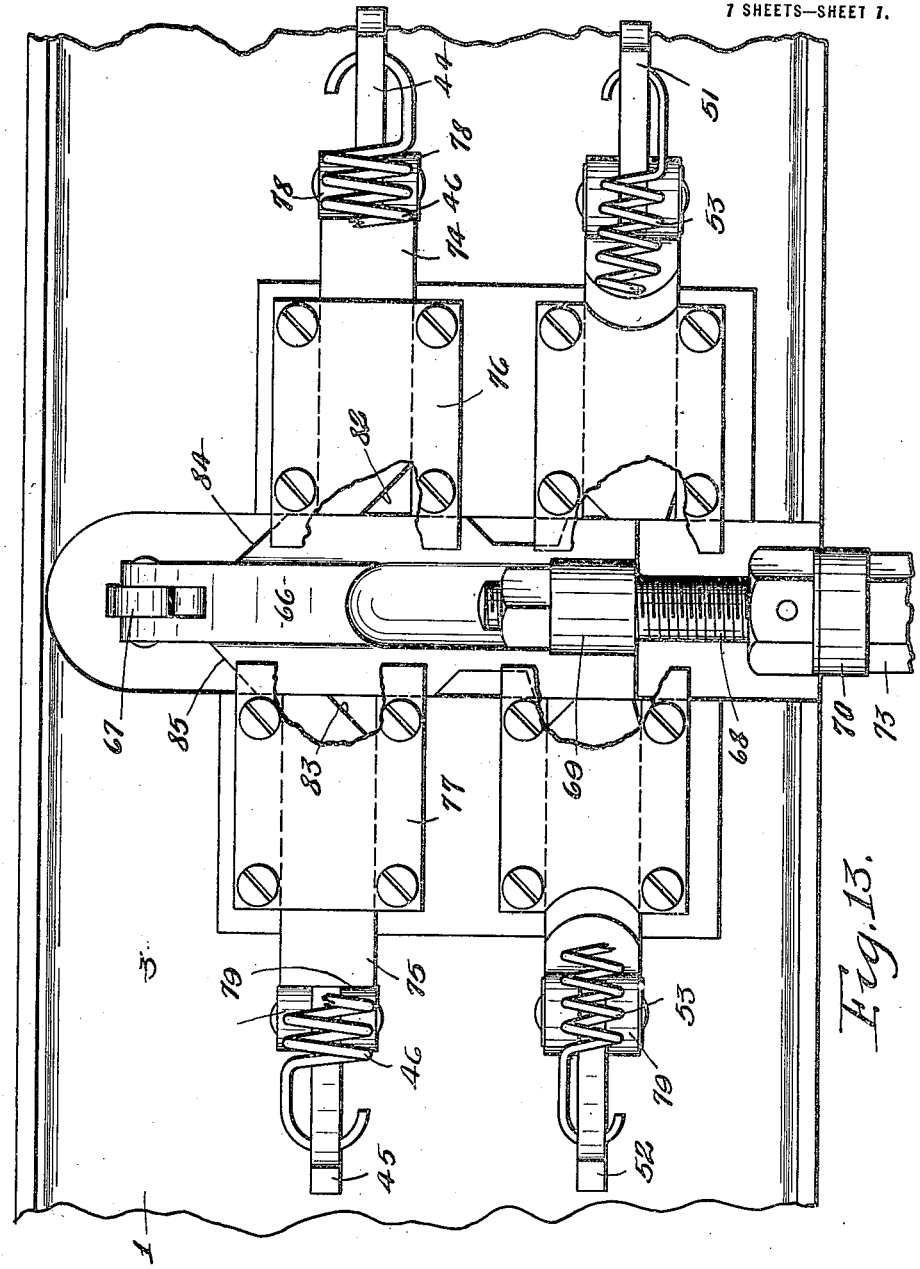
*INVENTOR.*
Burr M. Cartwright
BY
Parsons & Birdell
*ATTORNEYS.*

Patented Nov. 14, 1922.

1,435,696

UNITED STATES PATENT OFFICE.

BURR M. CARTWRIGHT, OF SYRACUSE, NEW YORK, ASSIGNOR OF ONE-HALF TO MALVIN S. GETMAN, OF SYRACUSE, NEW YORK.

STREET-INDICATING APPARATUS FOR STREET CARS.

Application filed August 13, 1919. Serial No. 317,280.

*To all whom it may cocnern:*

Be it known that I, BURR M. CARTWRIGHT, a citizen of the United States, residing at Syracuse, in the county of Onondaga and State of New York, have invented a certain new and useful Street-Indicating Apparatus for Street Cars, of which the following is a specification.

This invention has for its object an indicating apparatus particularly applicable for indicating the cross streets along the street railway lines, which apparatus is particularly simple in construction, highly efficient and durable in use, and it consists in the novel features and in the combinations and constructions hereinafter set forth and claimed.

In describing this invention, reference is had to the accompanying drawings in which like characters designate corresponding parts in all the views.

Figure 3:
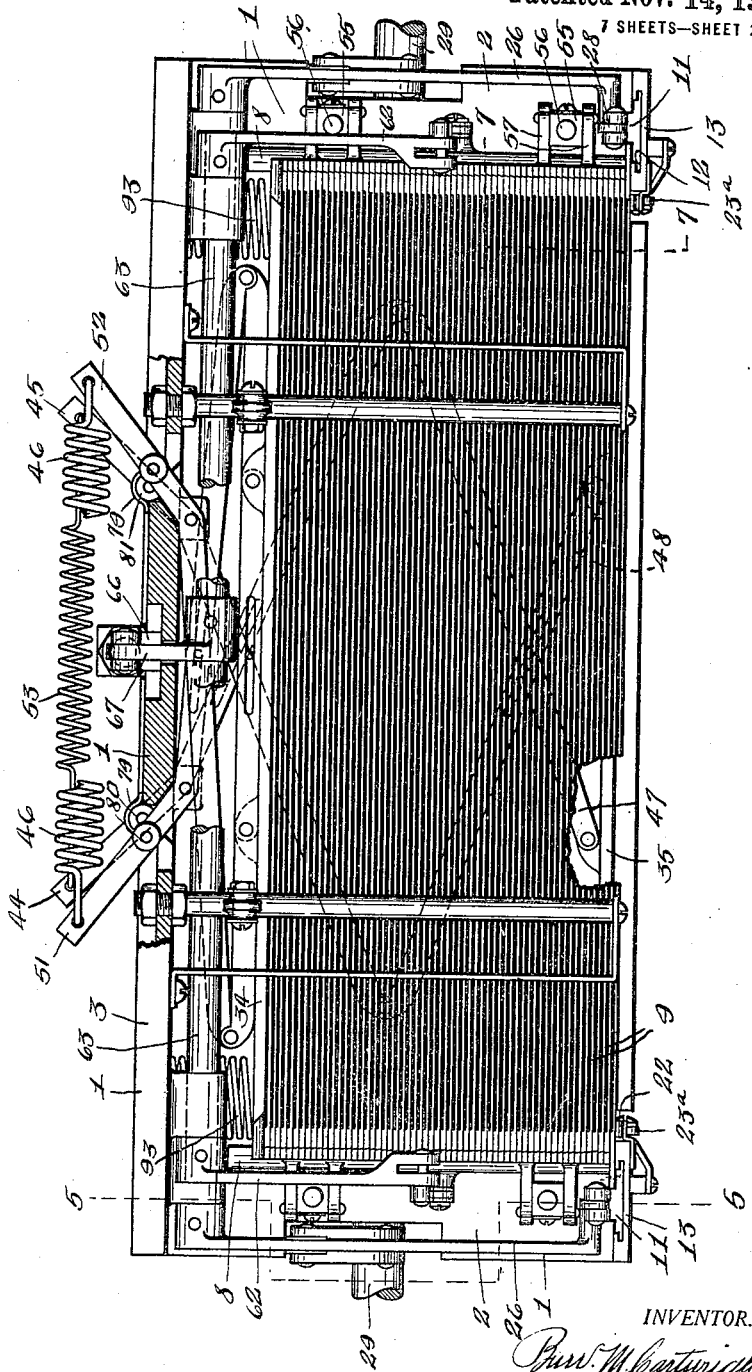
Figure 4:
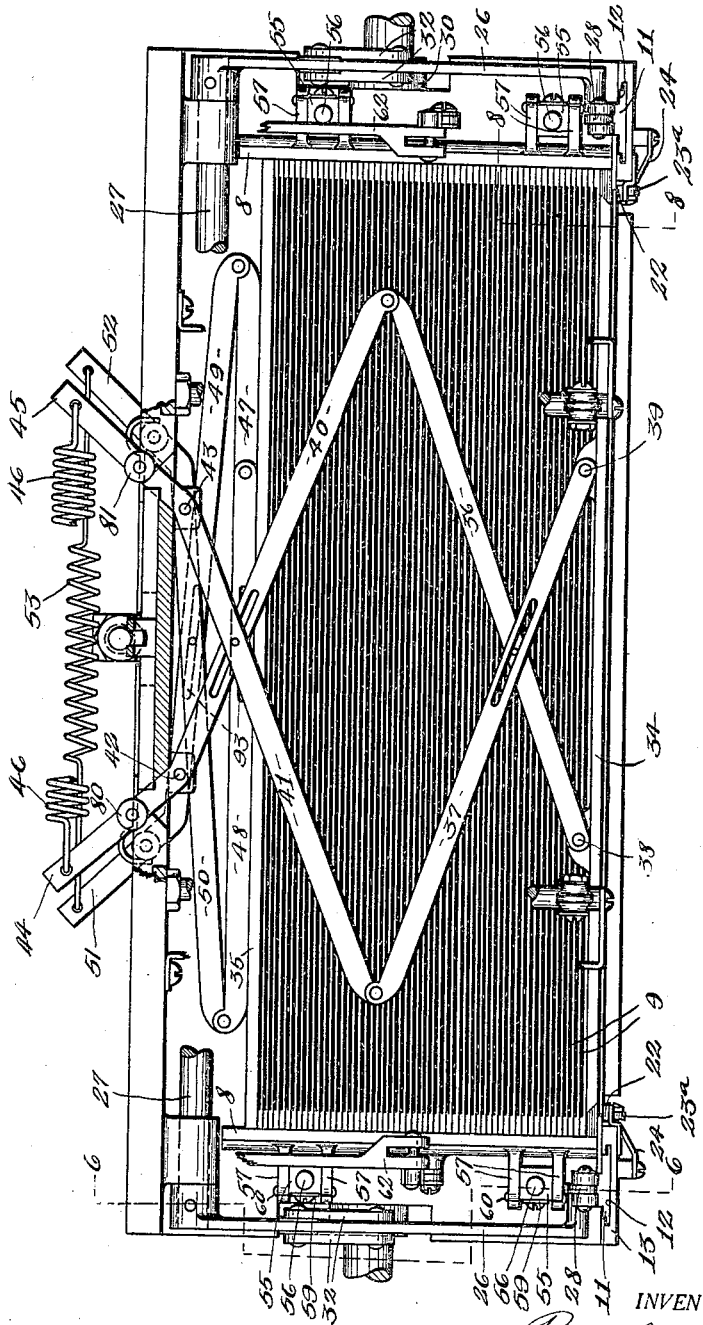
Figure 5:
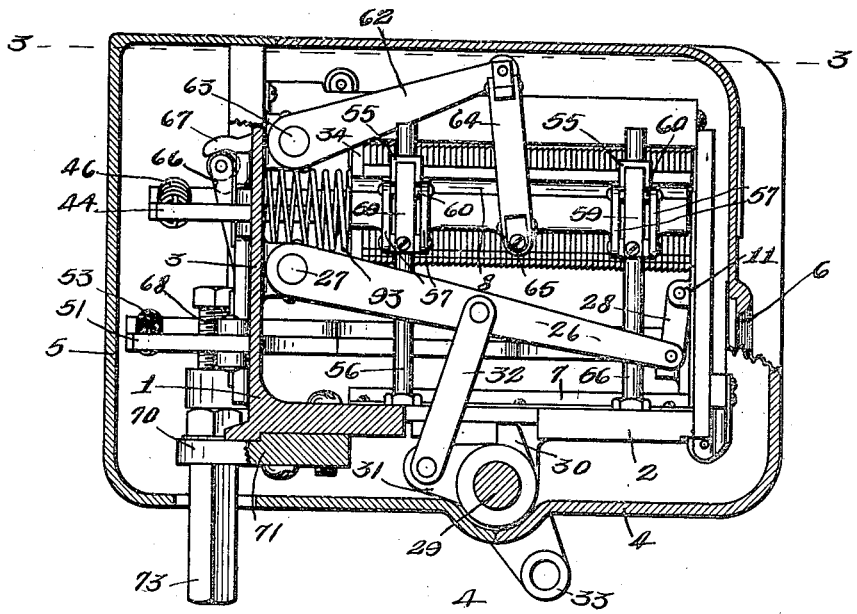
Figure 6:
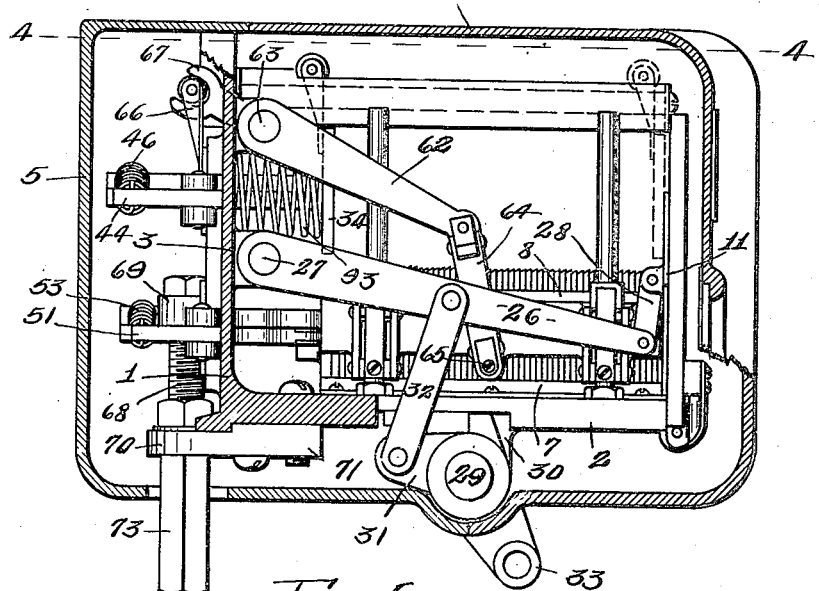

Figures 3 and 4 are sectional views taken on lines 3—3 and 4—4, Figs. 5 and 6 respectively.

Figures 5 and 6 are sectional views taken on lines 5—5, and 6—6, Figs. 3 and 4 respectively.

Figures 7 and 8 are enlarged fragmentary sectional views taken approximately on lines 7—7, 8—8, Figs. 3 and 4 illustrating the operation of the means for shifting the plates one by one from one guide to the other and for depressing the plates rearwardly in the latter guide preliminary to the shifting operation.

Figure 9 is a fragmentary view looking to the right in Figs. 7 and 8.

Figure 10 is an enlarged detail view illustrating in cross section one of the tracks for the plates arranged in the upper guide, the contiguous parts of the plates, the carriage for the tracks, and one of the guide rods for said carriage being also shown.

Figure 11 is a view similar to Fig. 10 illustrating the ratcheting action of the tracks when moving into engagement with the plates in the lower guide preliminary to the shifting of the plates in bulk in the lower guide to the upper guide or path.

Figures 12 and 13 are rear elevations of the mechanism in the back of the casing shown in Figs. 3 and 4, the back section of the case being removed, Fig. 12 showing the position of the parts when the plates are arranged in the top row, Fig. 13 showing the position of the parts when the plates have been shifted to the bottom row.

This street indicating apparatus comprises generally, a frame, indicators movable in paths in the frame, means for transferring the indicators one by one from one path to the other, and means for shifting the indicators in bulk from the latter path to the former, the frame being formed with a sight opening at the front end of one of said paths. These paths are in this embodiment of my invention shown as arranged one above the other in parallelism to each other, and the plates are initially arranged in the upper path and pressed forwardly therein by a follower and transferred one by one from foremost position in said path or row vertically in a foremost position in the lower path, the sight opening being preferably arranged at the front end of the lower row. Preliminary to the transferring operation of the foremost plate from the upper row to the lower row, the plates in the lower row are depressed rearwardly so that the foremost plate therein is to the rear of the plane of the foremost plate in the upper row about to be transferred.

The plates in the lower row are also pressed forwardly by suitable follower mechanism.

The frame 1 may be of any suitable form, size and construction and is here shown as in the form of a box including a bottom 2, and a rear wall 3.

The frame 1 is contained within a suitable casing including front and rear sections 4, 5, the front section 4 having a sight opening 6 therein and the rear section being removable.

The bottom wall 2 of the frame is provided with suitable tracks or guides 7, Figs. 7, 8 and 9 extending from front to rear thereof and also suitable guides or tracks 8 are normally arranged in the upper portion of the frame 1 parallel to the track 7, these two sets of tracks 7 and 8 defining two parallel as lower and upper paths for the indicator plates.

9 designates the indicator plates which are normally arranged and supported by the tracks 8, said plates having shoulders 10 at their ends which rest upon said tracks 8. All the plates are initially arranged in the upper row or path on the tracks 8 and are transferable one by one to the lower path or track 7 by means which operates to push or draw the foremost plate on the upper tracks 8 downwardly to the front end of the path defined by the tracks 7.

The means for thus transferring the plates one by one comprises a reciprocating member movable crosswise or vertically of the front ends of the upper row of plates, and as here shown, there are two of such pushers which engage the plates at their ends, both of these pushers being operated by a common actuator.

11 designates the pushers which are usually slides movable in vertical grooves or guides 12 formed in uprights 13 at the front of the frame and at opposite sides thereof, each pusher having a shoulder 14 for engaging the upper edge of the foremost plate 9 on the upper tracks 8 and also having a spring pressed ratcheting shoulder 15 for engaging a shoulder 16 at each end of the plates near their lower edges so that each pusher engages the plate at its upper edge and near its lower edge.

Preferably, the meeting edges of the shoulder 14 and the upper edges of the plates are oppositely beveled as shown at 17, Fig. 8, the bevel being such as to tend to force the plate forwardly. The ratcheting shoulder 15 is in the form of a flat bolt pressed into operative position by a spring 18 and movable in suitable guides 19 provided on the slide 11.

The shoulder 14 is provided at the upper end with a cutoff 20 forming part of the slide preventing the plates in the upper row from being pushed forwardly until the transferring operation is completed.

Each ratcheting shoulder 15 is provided with a ratcheting or bevel face 21 on its upper side which causes said shoulder to ratchet when it engages the shoulder 10 of the plate during the return of the pusher to its starting position, see Fig. 9.

The transfer means is also provided with means for depressing the plates in the lower row on the track 7 rearwardly so that the foremost plate therein is in a plane at the rear of the plate about to be transferred. In other words, this means depresses the plates in the lower row preliminary to the shifting or transferring operation. As here shown, this means comprises parts or members reciprocally movable with the pushers 11 and movable over the front face of the foremost plate on the lower track 7 and having their effective bearing faces movable in a plane at the rear of the plane of the foremost plate on the upper track 8.

In the illustrated embodiment of my invention, this means also includes a pair of flexible metal straps or tapes 22 fixed at their lower ends at 23 to the frame and extending upwardly across the end margins of the foremost plate 9 in the lower row and also extending upwardly across the foremost plate in the upper row about to be transferred and the parts which depress the plates in the lower row are rollers 23ª movable along said straps or tapes 22 and carried by brackets 24 rigid with the slides or pushers 11.

The rollers 23ª are arranged to travel or move away across the front face of the foremost plate on the lower track 7 so as to provide an outwardly diverging portion 25 of the strap 22 between the path or rows of plates whereby the foremost plate 9 in the uppermost row is guided in front of the foremost plate in the lower row on the track 7.

The means for actuating the slides 11 are arranged at opposite ends of the frame and include rock arms 26 pivoted at 27 at their rear ends to the rear wall 3 of the frame and connected at their front ends by means of links 28 to the slides 11.

The rock arms 26 are operated by a common actuator as a rock shaft 29 journaled in suitable bearings 30 depending from the bottom wall 2 of the frame and extending crosswise of the frame beneath the track 7, the rock shaft having the rock arms 31 thereon. Links 32 connect the rock arms 31 and the rock arms 26 whereby when the rock shaft is actuated and the parts are in their position shown in Fig. 5, the links 26 are first elevated to carry the pushers 11 therewith along the guides 12 until the shoulders 14 engages the upper edge of the foremost plate on the upper tracks 8 and the ratcheting bolt 15 engages the shoulder 16 of said plate, the bolt having passed the shoulder 10 during the upward movement of the slide 11, whereby the pushers are then moved downwardly to transfer the foremost plate in the upper row to the lower row.

Figure 1:
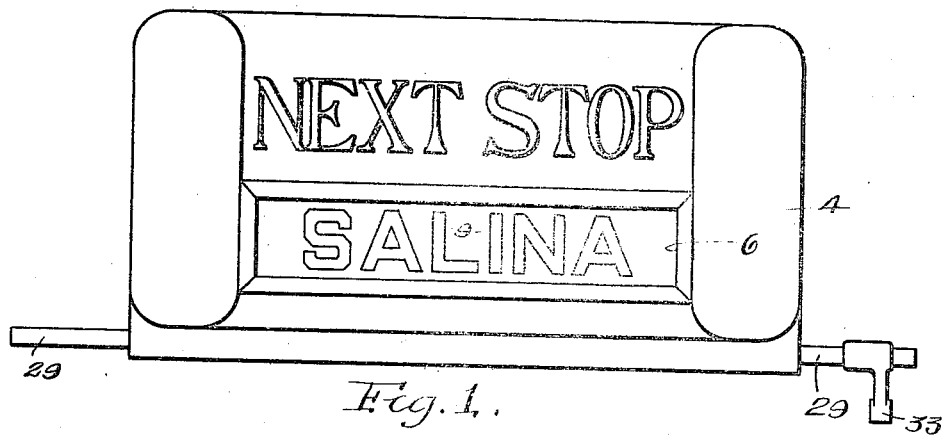
Figure 1 is a front elevation of one embodiment of this apparatus.
Figure 2:
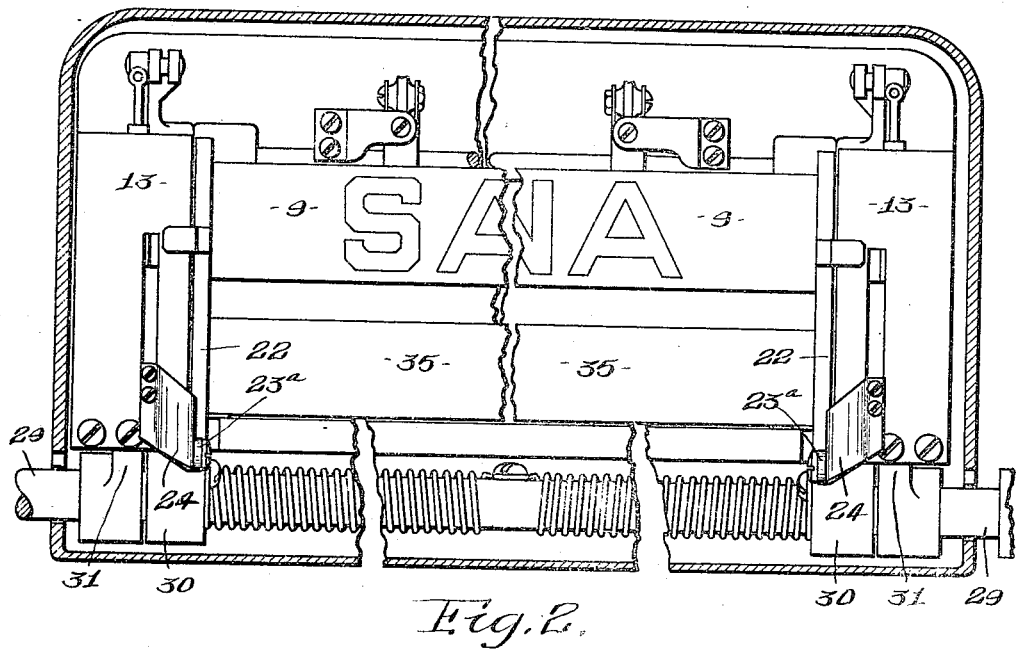
Figure 2 is a front elevation with the casing in section.

During the upward movement of the slides 11, the roller 23ª moves from the position shown in Fig. 2 to that shown in Fig. 8 to depress the plates in the lower row in order that the foremost plate in the upper row may be transferred thereto.

The shaft 29 is provided with a suitable arm 33 thereon by which connection is made to a suitable operating handle or other means as the piston working in an air cylinder.

The plates are pressed toward the front ends of the track 7 and 8 by suitable mechanism, here shown as including followers 34 and 35 arranged respectively to push the plates in the upper and lower rows forwardly and lazy tongs operating the followers.

The lazy tongs for the follower 34 includes levers 36, 37, Fig. 4 pivoted at 38 and 39 to the follower 34 at points spaced apart and also levers 40 and 41 pivoted to the levers 36 and 37 respectively and also pivoted at 42 and 43 to the rear end wall 3 of the frame 1 and having arms 44 and 45 extending rearwardly beyond their pivots, which arms are connected to a tension spring 46 so that the spring 46 when retracting also tends to extend the lazy tongs and push the follower 34 forwardly.

The follower mechanism for the plates in the lower rows is similar to that just described and includes levers 47, 48, 49 and 50, the levers 49, 50 having arms 51 and 52 connected by a tension spring 53. As the plates are transferred from the upper row to the lower row, the lazy tongs with the follower 34 push said follower forwardly while the lazy tongs for the lower row on the tracks 8 are being pushed rearwardly. In other words, the upper set of lazy tongs is extending while the lower set is folding. The lazy tongs are operated or reset as will be hereinafter described.

The means for transferring the plates in bulk from the lower row 7 to the upper row comprises mechanism for shifting the upper track 8 vertically into position to engage the shoulders 10 of the plates in the lower row and for elevating said tracks back to their normal position, the tracks having a ratcheting action into engagement with the shoulders 10.

As here shown, these tracks are pivoted at 54 to carriers or blocks 55 movable along suitable guides as rods 56 rising from the bottom 2 of the frame 1, the tracks having leaves 57 extending on opposite sides of the blocks 55, that is arranged astride said blocks; and springs 59 carried by the block 55 press against a pin 60 connecting the outer ends of said leaves, the springs resisting movement of the tracks on their pivots 54.

In order that the tracks may ratchet into engagement with the ends of the plates, the upper corners of the plates are beveled at 61, Figs. 10 and 11.

The tracks 8 are elevated and lowered by suitable mechanism, here shown as including rock arms 62 mounted on rock shaft 63 carried by the rear wall 3 of the frame at the rear of the upper row of plates and links 64 connecting the front ends of the rock arms 62 to the tracks 8 at 65 midway between their front and rear ends or midway between the guides 56.

The rock arms 62 are actuated as will be hereinafter described by means which operate to first rock in one direction the shaft 63 to carry the tracks 8 downwardly from the position shown in Fig. 5 to that shown in Fig. 6 along the guides 56 until the tracks ratchet into engagement with the shoulders 10 of the indicator plates of the lower row. Said arms are then operated to lift said tracks with the plates thereon into the upper row.

The means for operating the rock shaft 70 also operates to reset the lazy tongs of the follower mechanism. This mechanism is shown particularly in Figs. 12 and 13 and includes an actuator as a slide 66 movable vertically in guides on the rear face of the rear wall 3 of the frame and connected at its upper end to an arm 67, see Figs. 5, 6, 12 and 13, extending rearwardly from the rock shaft 63 on which the arms 62 are mounted.

This slide may be actuated in any suitable manner and as here illustrated it is actuated by a screw 68 held from endwise movement and threading in a bearing 69 on the slide.

The screw extending through a lug 70 provided on a bracket 71 secured to the under side of the bottom wall 1 of the frame and having a squared end 73 for receiving a suitable tool by means of which the screw is turned first in one direction to move the slide from its position shown in Fig. 12 to that shown in Fig. 13 and when turned in the opposite direction to return it to its position shown in Fig. 12 so that the rock arms 62 are first rocked downwardly to carry the tracks 8 into engagement with the plates in the lower row and then are rocked upwardly to carry the tracks 8 with its row of plates upwardly until the tracks reach their normal position in the upper path.

The lazy tong levers are operated by the slide 66 and as here shown, the rear arms 44, 45 of the levers 40 and 41 of the upper lazy tong levers are connected to slides 74, 75 movable in suitable guides 76, 77 on the rear face on the rear wall 3 of the frame 1 and having yokes 78, 79 at their ends respectively which engage rollers 80 and 81 on the rear arms 44, 45 of the lazy tong levers 40 and 41, these slides 74, 75 having cam surfaces 82, 83 at their inner ends which coact with wedge or cam surfaces 84, 85 on the slide 66. Hence during the upward movement of the slide 66, the cam surfaces 84, 85 engage cam surfaces on the inner ends of the slides 74, 75 and press said slides outwardly and likewise press the arms 44, 45 of the lazy tong levers 40, 41 outwardly causing the upper set of lazy tongs and the follower 34 connected thereto to be retracted.

The lower set of lazy tongs and its follower 35 have been previously retracted step by step as the plates are fed one by one from the upper tracks 8 to the lower tracks 7 but in order to prevent the follower from being moved suddenly forwardly by the spring 53 connected to the lazy tong arms 51, 52, slides 86 and 87 similar to the slides 74, 75 are connected to the arms 51, 52 of the lower set of lazy tong levers and these slides have cam faces 88, 89 at their inner ends which coact with complemental cam surfaces 90 and 91 on the slide 66 so that the spring 53 gradually contracts to permit the lowermost follower 35 to move forwardly as the slide 60 is being moved by the screw 68 downwardly to its starting position shown in Fig. 12. Suitable buffer springs 93 are arranged to engage the uppermost follower 34 as it is moved to its rearmost position.

In operation, the apparatus is placed in the street car where it is visible to the passengers in the car and the control is located within reach of the motorman who also has a miniature indicator operating in conjunction with this apparatus.

When a cross street is being approached the motorman operates either manually or through a power operating device as an air cylinder, the rock shaft 29 causing the rock arms 26 to be first moved upwardly carrying the pushers 11 therewith and then downwardly to move the foremost plate in the upper row into foremost position in the lower row opposite the sight opening 6.

This operation is repeated as the various cross streets are approached and when the end of the line is reached all of the plates in the upper row will have been transferred to the lower row and arranged therein in the same order in which they were arranged in the upper row.

When the end of the line is reached the motorman or conductor with a suitable tool applied to the square shank 73 of the screw 68 turns the screw 68 first in one direction and this movement moves the slide 66 upwardly causing it to rock the shaft 63 which in turn rocks the arms 62 and carries the upper tracks 8 which are now empty, downwardly until said tracks 8 ratchet into engagement with the shoulders 10 of the plates in the lower row. In other words, he turns the screw 68 to the limit of its movement in one direction.

He then turns the screw 68 to the limit of its movement in the opposite direction and during this operation the shaft 63 is rocked in the opposite direction causing the arms 62 to lift the tracks 8 and plates thereon into the upper row.

During the upward movement of the slide 66 the cams 84 and 85 thereon engage the cams 82 and 83 on the slides 74 and 75 and force the rear arms 44, 45 of the upper set of lazy tongs apart, and thus pull back the follower 34 of the upper row to its rearmost position so that tracks 8 can be elevated and carry the plates in front of the uppermost follower 34.

During the downward movement of the slide 66 the notches 90 and 91 come in register with the inner ends of the slides 86, 87 connected to the lazy tongs or the lowermost follower 35 and, permit this follower to be moved forwardly by its spring 53 to its foremost position along the lower track 7.

What I claim is:

1. In a street indicating apparatus for street cars, the combination of a frame, indicators movable in paths in the frame, means for moving the indicators one by one from one path to the other and means for shifting the indicators in bulk from the latter path to the former, substantially as and for the purpose specified.

2. In a street indicating apparatus for street cars, the combination of a frame and casing formed with a sight opening, indicators movable in paths in the frame, the sight opening being located at the end of one of said paths, means for transferring the indicators from one path to the other to the sight opening, means for feeding the indicators along the former path to the transfer means, and means for transferring the indicators in bulk from the latter path to the former, substantially as and for the purpose set forth.

3. In a street indicating apparatus for street cars, the combination of a frame, indicators movable in the two parallel paths in the frame, and initially arranged in one path, means tending to move the indicators in one direction along said path in which they are initially arranged, means operating to move the indicators one by one from said initial path to the second path and move them in the opposite direction in the second path, and means for transferring the indicators in bulk from the second to the initial path, substantially as and for the purpose described.

4. In a street indicating apparatus for street cars, the combination of a frame and casing therefor, indicators movable along the paths in the frame in opposite directions and initially arranged in one path, means tending to feed the indicators in one direction along the initial path, means for transferring the indicators one by one from said initial path to the second path, means for moving them in the opposite direction in said second path, the casing having a sight opening at the front end of one of said paths, and means for transferring the indicators in bulk from the second path to the guide in which they are initially located, substantially as and for the purpose set forth.

5. In a street indicating apparatus for street cars, the combination of a frame, plates movable in two paths in the frame and initially arranged in one path, means for transferring the foremost plate in said initial path crosswise into the other or second path, said means comprising a member movable crosswise of the front ends of said paths, means for pressing the plates forwardly in said paths, and means operated by the plate transferring member for depressing the plates rearwardly in the second path preliminary to the transferring operation, substantially as and for the purpose described.

6. In a street indicating apparatus for street cars, the combination of a frame, plates movable in two paths in the frame and initially arranged in one path, means for transferring the foremost plate in said initial path crosswise into the other or second path, said means comprising a member movable crosswise of the front ends of said paths, means for pressing the plates forwardly in said paths, and means operated by the plate transferring member for depressing the plates rearwardly in the second path preliminary to the transferring operation, comprising a bearing face on said movable member in a plane located in the rear of the foremost plate about to be shifted from the initial path to the second path and across the face of the foremost plate in the second path, substantially as and for the purpose specified.

7. In a street indicating apparatus for street cars, the combination of a frame, plates movable in two paths in the frame and initially arranged in one path, means for transferring the foremost plate in said initial path crosswise into the other or second path, means for depressing the plates forwardly in said paths, and means operated by the plate transferring means for depressing the plates rearwardly in the second path preliminary to the transferring operation, comprising a flexible strap secured at one end to the frame and extending crosswise of the foremost plate in the second path and a part movable along the strap to press the same against the foremost plate in the second path and depress the same to the rear of the plane of the foremost plate about to be transferred and means for operating said part, substantially as and for the purpose set forth.

8. In a street indicating apparatus for street cars, the combination of a frame, plates movable in two paths in the frame and initially arranged in one path, means for transferring the foremost plate in said initial path crosswise into the other or second path, means for depressing the plates forwardly in said paths, and means operated by the plate transferring means for depressing the plates rearwardly in the second path preliminary to the transferring operation, comprising a flexible strap secured at one end to the frame and extending crosswise of the foremost plate in the second path and a part movable along the strap to press the same against the foremost plate in the second path and depress the same to the rear of the plane of the foremost plate about to be transferred, and means for operating said part, said strap extending also across the face of the plate about to be transferred forming a guide to direct the plate about to be transferred, substantially as and for the purpose described.

9. In a street indicating apparatus for street cars, the combination of a frame, indicator plates movable in the guides and initially arranged in one guide, a reciprocating transfer member movable crosswise of the paths for pushing the foremost plate in the initial path crosswise into foremost position in the other or second path, means for pressing the plates forwardly in the paths, straps fixed at like ends to the frame and extending crosswise of the foremost plate in the second path to which a plate is to be shifted and also across the face of the foremost plate in the initial path from which said plate is to be shifted, and parts movable with said reciprocating member, and over said straps in a plane located to the rear of the plate about to be shifted, substantially as and for the purpose set forth.

10. In a street indicating apparatus for street cars, the combination of a frame, indicator plates movable along substantially parallel paths in the frame and initially arranged in one path, means for transferring the plates one by one from the initial path to the other or second path, and means for shifting the plates in bulk from the latter path to the former comprising a carrier movable transversely of the guides and having means for engaging the plates at their ends to support the same, and means for moving the carrier in a position alongside one path into a position alongside the other path, substantially as and for the purpose specified.

11. In a street indicating apparatus for street cars, the combination of a frame, indicators movable in substantially parallel paths in the frame and initially arranged in one path, means for transferring the plates one by one from the initial path to the other or second path, means for shifting the plates in bulk from the second path to the initial path, the plates having shoulders at their ends and said means comprising carriers formed with shoulders arranged to ratchet into engagement with the shoulders of the plates, and means for moving said carrier from positions alongside the initial path into a position alongside the second path to ratchet said shoulders into engagement with the plates in the second path, and for moving the carriers in the opposite direction, substantially as and for the purpose set forth.

12. In a street indicating apparatus, the combination of a frame, indicator plates movable in the frame in substantially parallel paths and initially arranged in one path, means for transferring them one by one from the initial path to the other or second path, said plates being formed with shoulders at their opposite ends, tracks extending along the initial path and engaging said shoulders, the tracks having a ratcheting movement into and out of engagement with the shoulders, means for feeding the plates lengthwise of the tracks and off the ends of the same, means for transferring them one by one into the second path, and means for moving the tracks from their normal position into a position alongside the second path into ratcheting engagement with the plates in the second path and for moving said tracks back to their normal position to carry the plates in bulk to their original path, said means comprising a rock shaft carried by the frame, rock arms on said shaft, connections between the rock arms and the tracks, and means for rocking the shaft, substantially as and for the purpose described.

13. In a street indicating apparatus for street cars, the combination of a frame, stationary tracks, movable tracks arranged parallel to the stationary tracks above the same, carriages for the latter tracks, the tracks forming two parallel guides, indicator plates initially supported by the movable tracks, said movable tracks having a ratcheting movement laterally into and out of engagement with the plates, means for transferring the plates one by one from the movable tracks from their normal position downwardly into engagement with the plates on the stationary tracks and also moving such movable tracks back to their normal position, substantially as and for the purpose specified.

14. In a street indicating apparatus for street cars, the combination of a frame formed with a guide, indicator plates arranged in the guide, means for feeding the plates toward one end of the guide including a follower, lazy tongs including a lever pivoted at points spaced apart to the follower, and levers pivoted at points spaced apart to the frame, the latter levers having arms projecting beyond their pivots and a tension spring connecting said arms, substantially as and for the purpose set forth.

15. In a street indicating apparatus for street cars, the combination of a frame formed with parallel guides, indicator plates movable in the guides and initially arranged in one guide, means for transferring the plates one by one from the front end of one guide to the other guide, followers in the guides and movable in opposite directions therein, means for actuating the followers comprising lazy tongs including levers pivoted at their ends to the followers and levers pivoted to the frame between their ends and having arms extending beyond their pivots and a spring connecting the arms of each of the lazy tongs, and means for retracting the lazy tongs in the guide in which the plates are initially arranged and controlling the extension of the lazy tongs in the other guide, substantially as and for the purpose set forth.

16. In a street indicating apparatus for street cars, the combination of a frame and casing therefor, indicators movable in substantially parallel paths in the frame and initially arranged in one path, the casing being formed with a sight opening at the front end of one of the paths, followers movable in the paths against the plates therein, means for actuating the followers, means for transferring the foremost plate in one path into foremost position in the other path, and means for shifting the plates in bulk from the latter path to the former, said means including mechanism for operating the actuating means for the followers to reset said followers in their starting position, substantially as and for the purpose described.

In testimony whereof, I have hereunto signed my name, at Syracuse, in the county of Onondaga, and State of New York, this 23rd day of April, 1919.

BURR M. CARTWRIGHT.